United States Patent
Cleveland, III

(10) Patent No.: US 6,390,927 B1
(45) Date of Patent: May 21, 2002

(54) SPRING LOADED U-JOINT WITH SPRING RETAINING SURFACE

(75) Inventor: Orison Cleveland, III, Palm Bay, FL (US)

(73) Assignee: Cleveland Tool Corporation, Palm Bay, FL (US)

( * ) Notice: Subject to any disclaimer, the term of this patent is extended or adjusted under 35 U.S.C. 154(b) by 0 days.

(21) Appl. No.: 09/537,603

(22) Filed: Mar. 29, 2000

Related U.S. Application Data

(63) Continuation-in-part of application No. 09/426,936, filed on Oct. 22, 1999.

(51) Int. Cl.$^7$ ................................................. F16D 3/16
(52) U.S. Cl. ...................... 464/119; 464/112; 464/136; 81/177.75; 81/177.6; 403/321
(58) Field of Search ........................... 81/177.75, 177.6; 464/112, 113, 114, 119, 136; 403/321, 112, 113, 119, 120, 121, 166

(56) References Cited

U.S. PATENT DOCUMENTS

| | | |
|---|---|---|
| 1,102,863 A | 7/1914 | Bojas |
| 1,324,898 A | 12/1919 | Hopcraft |
| 1,485,036 A | 2/1924 | Kingsley |
| 2,196,297 A | 4/1940 | Gagne |
| 2,327,821 A | 8/1943 | Rueb |
| 2,499,569 A | 3/1950 | Cooley |
| 3,122,901 A | 3/1964 | Thompson |
| 3,522,713 A | 8/1970 | Hayes |
| 4,065,941 A | 1/1978 | Aoki |
| 4,075,913 A | 2/1978 | Tye |
| 4,721,493 A | 1/1988 | Lane |
| 5,458,028 A | * 10/1995 | Cleveland, III .......... 81/177.75 |

OTHER PUBLICATIONS

U.S. application No. 08/192,359, filed Feb. 7, 1994, George P. Juliano.

* cited by examiner

*Primary Examiner*—Lynne H. Browne
*Assistant Examiner*—Aaron Dunwoody
(74) *Attorney, Agent, or Firm*—Troutman Sanders LLP; Wm. Brook Lafferty

(57) ABSTRACT

An improved universal joint device for socket wrenches. The improved device is constructed with non-slip spring retaining surfaces on the handle and socket portions of the device for receiving the ends of a coil spring which can maintain the universal joint in alignment during both tension and compression. The device is otherwise free of grooves or apertures for mounting the spring to the handle and socket portions.

15 Claims, 2 Drawing Sheets

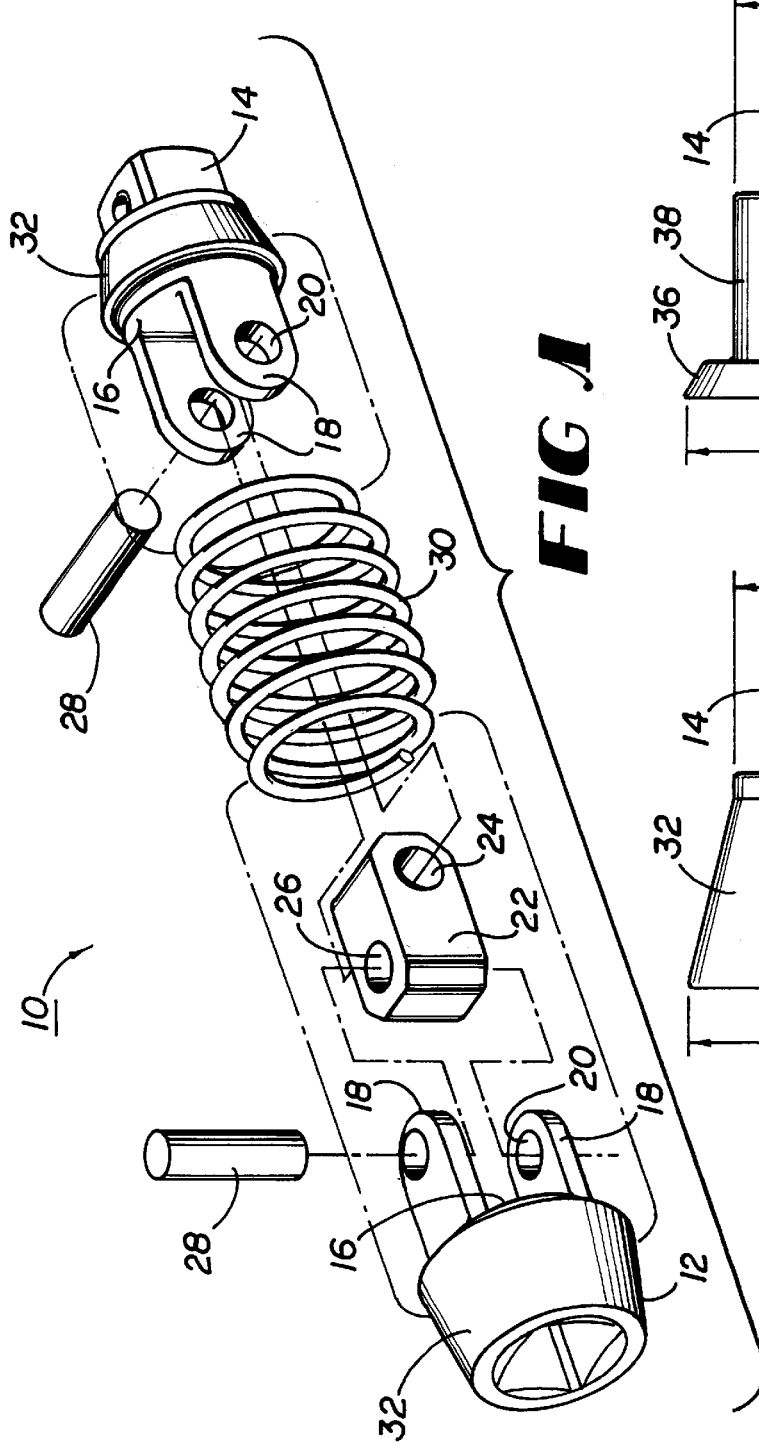
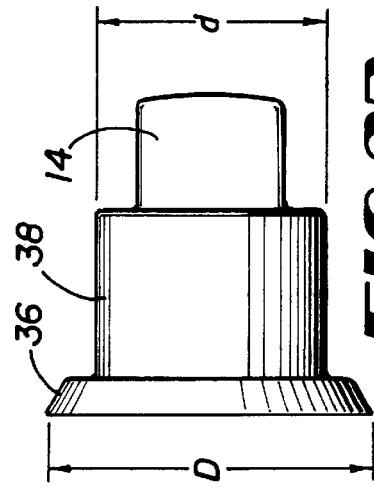
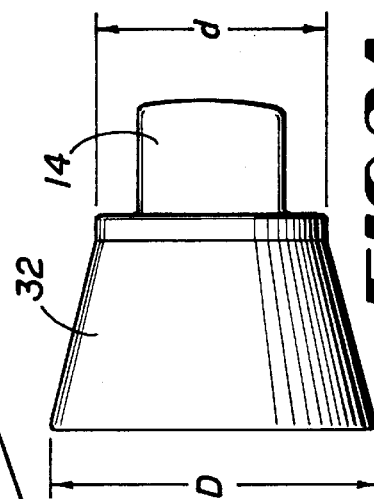

SPRING LOADED U-JOINT WITH SPRING RETAINING SURFACE

RELATED APPLICATION

This application is a continuation-in-part of application Ser. No. 09/426,936, entitled "Socket Wrench Device," filed Oct. 22, 1999.

TECHNICAL FIELD

The present invention relates to a spring loaded tool device. This invention more particularly pertains to a spring-loaded, variable tension, self-aligning universal joint adapter system for socket wrenches.

BACKGROUND OF THE INVENTION

The tool-making industry manufactures a myriad of adapters for its tools. One known type of adapter is a universal joint adapter for use with socket wrenches. This known universal adapter typically includes: a handle portion and a socket portion. Each end portion includes a bifurcated or forked end yoke member with a pair of arms. A swivel block pivotally connects the handle and socket portions via each pair of arms. A spring surrounds the swivel block and the handle and socket portions. The spring encircling the end portions and swivel block permits a user to hold a socket wrench in alignment with a nut or bolt, for example, without having to re-apply the wrench to the object several times. Without the spring, the end portions of the universal joint would not be able to maintain a desired angle or be maintained in concentric alignment.

There are a number of known methods for coupling the ends of the spring to the end portions of the device. One known method is to provide an aperture in each end portion for receiving and securing an end of the spring. In this embodiment, each end of the spring is configured to define a projection which extends radially inward. The radially extending ends are sized and configured to be retained in the aperture of each end portion. In other words, each end of the spring terminates in the aperture in the end portions. In this embodiment, the interconnection of the spring and the end portion is difficult to terminate because the radially extending ends typically have to be pried out of the apertures to remove the spring from encircling the end members and the swivel block.

However, a spring coupled in this manner is not capable of providing simultaneous exertion of compression and tension forces on opposing sides of the handle and socket portions because the spring is only mounted at one point along the circumference of each end portion. A single point of contact can not simultaneously exert opposing compression and tension forces on opposite end portions. Accordingly, this method requires a spring having a substantially greater wire diameter (making the spring substantially stiffer) in order that the forces exerted by the spring at each single point of contact do not bias the device in a non-axially aligned manner. Such stiff springs are detrimental to the goal of flexibility of the device.

In a second embodiment for coupling the spring to the handle and socket portions, the spring is mounted in annular grooves positioned in both the handle portion and the socket portion. This manner of coupling the spring to the handle and socket portions is disclosed in my U.S. Pat. No. 5,458,028, entitled "SOCKET WRENCH DEVICE", the entire disclosure of which is incorporated herein by reference. This patent discloses annular grooves in the end portions having outer and inner lips or shoulders which define the inner and outer boundaries of the grooves within the socket and handle portions, respectively. By mounting the spring in this manner, the end portions are coaxially aligned in both tension and compression. However, machining such annular grooves adds significant expense in manufacture, and these annular grooves do not permit the spring to be removed from the handle and socket portions in an easy manner. The difficulty in removing the spring can be remedied by double voids in the inner lip of a groove at one end of the device, as disclosed in my earlier patent. The purpose of the voids is to create a gap between the spring and the underlying lip or groove to facilitate removal and replacement of the spring. These voids may be obtained by machining away a portion of the outer surface of the lip. However, because of the orientation of the device as well as the location of the lip, machining the outer surface of the lip or groove is often a difficult machining operation, adding further manufacturing cost.

In response to the realized inadequacies of these known socket wrench devices, it became clear there is a need in the art for an easier and more economical manner of coupling the spring to the socket and handle portions of the device. This new socket wrench device must be capable of imparting both compression and tension forces to each yoke simultaneously, without slippage, at more than just a single point. Moreover, this new socket wrench device must permit the spring to be removed and replaced in an easy and economical manner.

SUMMARY OF THE INVENTION

The present invention solves the above-identified problems by providing an improved socket wrench device. The present invention seeks to provide an efficient method of mounting a coil spring to portions to a universal joint, while satisfying the need for imparting both compression and tension forces to each yoke simultaneously, which permits an advantageous reduction in spring strength and stiffness. Moreover, this new socket wrench device must permit the spring to be removed and replaced in an easy and economical manner.

Generally described, the present invention includes a universal joint having a handle portion and a socket portion. A swivel block is pivotally connected to both the handle and socket portions. The invention further includes a concentric aligning spring encircling the handle and socket portions and the swivel block for providing self-aligning forces.

The ends of the spring are coupled to the handle and socket portions by providing a non-slip spring retaining surface at least partially around the circumference of each of the handle and socket portions. When the spring is mounted on the handle and socket portions, the non-slip spring retaining surfaces contact the inner diameter of each end of the spring.

In accordance with one embodiment of the present invention, the non-slip spring retaining surface is a tapered surface on both the handle and socket portions. Each tapered surface underlies one of the ends of the spring such that the inner diameter of the ends of the spring grip the tapered surfaces. By interconnecting the handle and socket portions of the device with the ends of the springs in such a manner, the spring of the socket wrench device is able to hold the handle and socket portions in alignment, while also allowing the spring to be easily removed and replaced when the device is no longer in use, or when other performance characteristics are desired.

In accordance with another embodiment of the present invention, the non-slip spring retaining surface is an axially outward extending shoulder portion and a substantially horizontal shoulder portion on both the handle and socket portions. Each horizontal portion underlies one of the ends of the spring such that the spring is positioned behind the shoulder portion and the inner diameter of the ends of the spring grip the horizontal portions. The combination of the horizontal and shoulder portions cooperate in a manner to enable the device to operate in a manner similar to that mentioned above with the use of the tapered surfaces as spring retaining surfaces.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 1 is an exploded perspective view of one embodiment of the socket wrench device of the present invention.

FIGS. 2A and 2B are partial side elevation views of different embodiments of the socket wrench device illustrating an enlarged view of the handle portion.

Similar reference characters refer to similar parts throughout several views of the drawings.

DETAILED DESCRIPTION

Figure 3A:
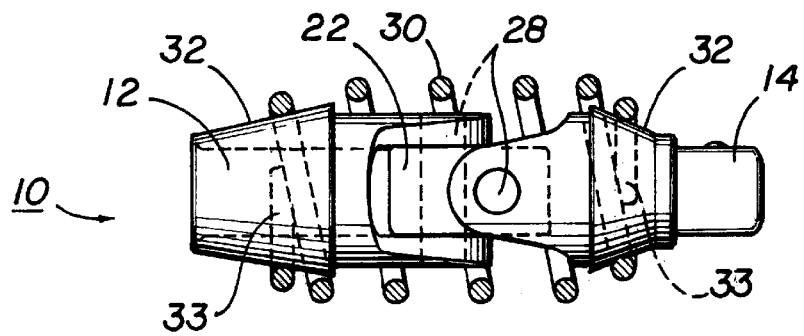
FIGS. 3A and 3B illustrate the location of the memory position in one embodiment of the present invention while the device is pivoted between the axially aligned position and the axially deflected position.

Referring now to the drawing in which like numerals indicate like elements throughout the several views, FIG. 1 illustrates an exemplary embodiment of a socket wrench device 10. Generally described, the socket wrench device 10 includes a universal joint having a handle portion 12 and a socket portion 14. Both the handle portion 12 and the socket portion 14 include a bifurcated or forked end yoke member 16. Each end yoke member 16 includes a pair of arms 18 having a bore hole 20 therethrough.

The socket wrench device 10 of the present invention further includes a swivel block 22 with a pair of axially perpendicular holes 24 and 26. The swivel block 22 is inserted between both pairs of arms 18 of the forked members 16 to pivotally connect the handle and socket portions 12, 14 together. The swivel block 22 is maintained between the handle and socket portions 12, 14 by pins 28 which are press fitted through the bore holes 20 and the corresponding axially perpendicular holes 24, 26.

A coil spring 30 surrounds the swivel block 22 and is mounted to the handle and socket portions 12, 14 by contacting non-slip spring retention surfaces on both portions 12, 14 such that the device 10 can hold the spring 30 in place. FIGS. 2A and 2B best illustrate non-slip spring retention surfaces on the handle portion 12. The non-slip spring retention surface is machined into the surface of the handle and socket portions in a manner known to those skilled in the art. In preferred embodiments, the non-slip spring retention surface includes variations in the outer diameter of the handle and socket portions 12, 14, wherein the outer diameter of the respective portion decreases to some extent towards its distal end. Because the present invention does not require annular grooves in the handle and socket portions, less material is required to manufacture the handle and socket portions resulting in the handle and socket portions having a smaller outer diameter. Consequently, the socket wrench device 10 may be made smaller. However, those skilled in the art understand that a variety of methods may be used to remove portions of the handle and socket portions of the device to create a non-slip spring retention surface.

FIG. 2A illustrates a partial elevation view of the handle portion 12 having a tapered surface 32 for retaining the end of the spring 30. In this embodiment, the tapered surface 32 encircles the entire 360 degree periphery of the handle portion 12. However, in other embodiments, the handle and socket portions 12, 14 may instead be an array of tapered surfaces positioned equidistant apart from one another along the periphery of the handle and socket portions 12, 14. Typically, the spring 30 is installed by hand by threading the spring 30 against the handle and socket portions 12, 14 until the ends coils 33 of the spring 30 are positioned in the desired location upon the tapered surface 32.

The end of the spring 30 is able to remain in contact with the handle portion 12 because the handle portion 12 has a slightly increased outer diameter adjacent the swivel block 22. Both the handle and the socket portions 12, 14 have varying outer diameters at various points along their length. In FIGS. 2A and 2B, the outer diameter of the portion of the handle portion nearest the swivel block 22 is shown generally by reference letter D, and the outer diameter of the portion of the handle portion furthest from the swivel block 22 is shown generally by the reference letter d. For example, when utilizing a ¾"×2 ¹¹⁄₁₆" steel universal joint from Boston Gear Works, North Quincy, Mass., the maximum outer diameter D of the tapered surface is approximately 0.750 inches and the minimum outer diameter d of the tapered surface is approximately 0.67 inches. Also, when utilizing a standard ⅜" Cleveland type U-joint, the outer diameters D and d are approximately the same as described above.

It is possible to create a broad range of tapered surfaces ranging from a very steep taper to a smaller, more gradual taper. Generally, the angle of the taper is dependent on the size of the spring. Although the non-slip spring retaining surface is described in FIGS. 2A and 2B as existing on the handle portion 12, a non-slip spring retaining surface also exist upon the socket portion 14 as shown in the other Figures.

Figure 4A:
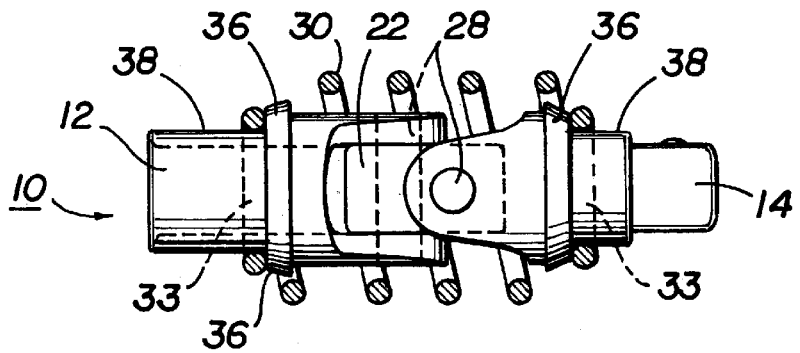
FIGS. 4A and 4B illustrate the location of the memory position in an alternative embodiment of the present invention while the device is pivoted between the axially aligned position and the axially deflected position.
Figure 4B:
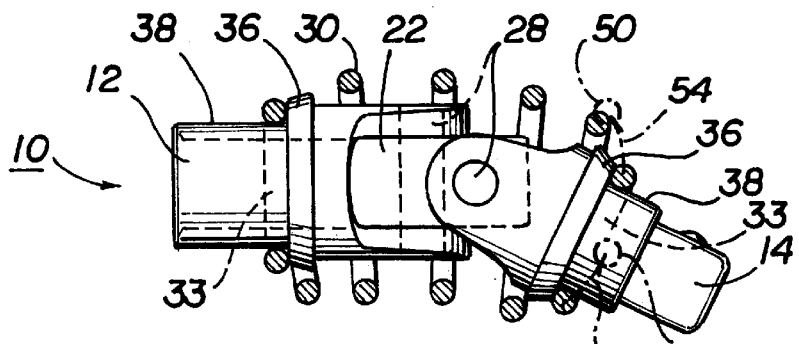

FIG. 2B illustrates an alternative embodiment of the non-slip spring retention surface. In FIG. 2B, the socket portion 14 includes an axially extending shoulder portion 36 and a substantially horizontal portion 38. Each horizontal portion 38 underlies one of the ends of the spring 30. As shown in FIGS. 4A and 4B, a coil of the spring 30 passes over the shoulder portion 36 so that the spring is positioned behind the shoulder portion 36 so that the inner diameter of the ends of the spring 30 grips the horizontal portion 38. The combination of the horizontal and shoulder portions 36, 38 cooperate to retain the spring 30 in a manner that is capable of imparting both compression and tension forces to each yoke member 16 simultaneously. Although the non-slip spring retention surface of the present invention is described as having either a tapered surface 32 or the combination of a shoulder portion 36 and a horizontal 38, alternative embodiments of the non-slip spring retention surface of the present invention can exist that may also utilize variations in diameter size to retain an end of a spring in contact with the handle and socket portions such that they may not be separated from one another without requiring additional force.

Variable force vectors are created by the coil spring 30 when the universal joint of the device 10 is in an axially aligned position or pivoted into an axially deflected position. The device 10 has a normal spring compression while in the axially aligned position. Preferably, the compression and tension forces are applied from the spring 30 to the yoke 16 about the 360 degree periphery of the socket portion 14. However, in other embodiments, these forces may be applied to less than the 360 degree periphery depending upon the materials used and the application desired so long as, to some extent, both compression and tension are applied at more than a single point of contact. When the device 10 has axial deflection, increased spring compression and tension is created and the opposing compression and tension forces act upon the yoke 16 of the socket portion 14. Because the handle and socket portions 12, 14 at some point each have slightly larger diameters compared to the inner diameters of the ends of the spring 30, the ends of the spring 30 are securely mounted to the handle and socket portions 12, 14 such that there is only a minimum of deflection, if any, at the end of the spring relative to the handle or socket portion 12, 14. Thus, both compression and tension forces may still be created simultaneously on each of the handle and sockets portions of the device 10.

Figure 3B:
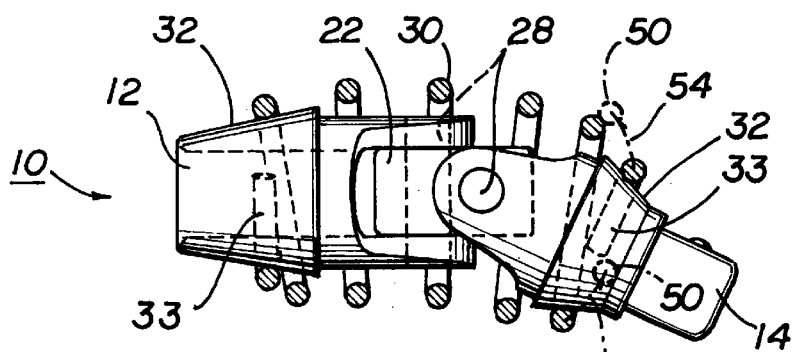

FIGS. 3A and 3B illustrate the location of the memory position of the spring 30, identified by reference number 50, while the devise 10 is pivoted between the axially aligned position and the axially deflected position, respectively. FIG. 3B illustrates that the device 10 with the non-slip tapered surface 32 has the ability to impart both compression and tension forces to each yoke simultaneously. FIGS. 4A and 4B illustrate the location of the memory position on the alternative embodiment described above. During axial deflection, the forces acting on the end coils 33 of spring 30 to return to the memory position 50 are identified by reference numbers 52 and 54 in FIGS. 3B and 4B.

From the foregoing description, it will be appreciated that the present invention provides a multiple display device coordination system to provide a singular control mechanism for coordinating multiple display devices. The present invention has been described in relation to particular embodiments which are intended in all respects to be illustrative rather than restrictive. Those skilled in the art will understand that the principles of the present invention may be applied to, and embodied in, various combination of hardware and software with various types of interface and transmission technology. Alternative embodiments will become apparent to those skilled in the art to which the present invention pertains without departing from its spirit and scope. Accordingly, the scope of the present invention is described by the appended claims and supported by the foregoing description.

What is claimed is:

1. A universal joint device for a socket wrench, comprising:
   a handle portion having a forked end member and a non-slip spring retaining surface extending at least partially around the periphery surface of said handle portion;
   a socket portion having a forked end member and a non-slip spring retaining surface extending at least partially around the periphery surface of said socket portion;
   an intermediate swivel block;
   means for proving a first pivotal connection of said forked end member of said handle portion to said handle swivel block, and means for providing a second pivotal connection of the forked end member of said socket portion to said swivel block, such that the axes of said first and second pivotal connections are at substantially right angles to each other; and a spring concentric with and encircling said swivel block, said spring mounted to said handle and socket portions on said non-slip spring retaining surfaces, wherein each said non-slip spring retaining surface is a tapered surface, said tapered surface each narrowing gradually away from each other and wherein at least one of said tapered surfaces has an axial length greater than a maximum cross-sectional dimension of an end coil of said spring.

2. The universal joint device of claim 1 wherein a diameter of said socket or handle portion adjacent said swivel block is larger than a diameter of said socket or handle portion further from said swivel block.

3. A universal joint device for a socket wrench, comprising:
   a handle portion having a forked end member and a non-slip spring retaining surface extending at least partially around the periphery surface of said handle portion;
   a socket portion having a forked end member and a non-slip spring retaining surface extending at least partially around the periphery surface of said socket portion;
   an intermediate swivel block;
   means for proving a first pivotal connection of said forked end member of said handle portion to said handle swivel block, and means for providing a second pivotal connection of the forked end member of said socket portion to said swivel block, such that the axes of said first and second pivotal connections are at substantially right angles to each other; and a spring concentric with and encircling said swivel block, said spring mounted to said handle and socket portions on said non-slip spring retaining surfaces, wherein each said non-slip retaining surface is an axially outwardly extending shoulder portion and a substantially horizontal portion, said spring positioned on said horizontal portion and behind said shoulder portion.

4. The universal joint device of claim 3 wherein said horizontal portion has a substantially uniform diameter throughout.

5. The universal joint device of claim 3 wherein said socket or handle portion at said shoulder portion has a diameter greater than said socket or handle portion at said horizontal portion.

6. The universal joint device of claim 3 wherein said shoulder portion is tapered to gradually narrow away from said swivel block.

7. A universal joint device for a socket wrench, comprising:
   a handle portion having a forked end member and a non-slip spring retaining surface extending at least partially around the periphery surface of said handle portion;

a socket portion having a forked end member and a non-slip spring retaining surface extending at least partially around the periphery surface of said socket portion;

an intermediate swivel block;

means for proving a first pivotal connection of said forked end member of said handle portion to said handle swivel block, and means for providing a second pivotal connection of the forked end member of said socket portion to said swivel block, such that the axes of said first and second pivotal connections are at substantially right angles to each other; and a spring concentric with and encircling said swivel block, said spring mounted to said handle and socket portions on said non-slip spring retaining surfaces, wherein said device is otherwise free of recessed and aperture means for mounting said spring to said handle and socket portions.

8. The universal joint device of claim 7 wherein said forked end members of said handle portion and said socket portion are each provided with a pair of arms having bore holes, wherein said swivel block is provided with a pair of axially perpendicular holes bored therethrough, and wherein said first and second pivotal connections means each include a pin for pivotally connecting the respective handle portion or socket portion with said swivel block through said bore holes in said pair of arms of said forked end member and through one of the holes in said swivel block.

9. The universal joint device of claim 7 wherein said non-slip spring retaining surfaces extend entirely around the periphery of each said handle and socket portions.

10. The universal joint device of claim 7 wherein said spring is retained on each of said handle and socket portions in both tension and compression.

11. The universal joint device of claim 7 wherein said non-slip spring retaining surfaces are defined by at least a portion on each of said handle and socket portions having a variable diameter.

12. The universal joint device of claim 11 wherein said variable diameter decreases with the distance from said swivel block.

13. The universal joint device of claim 7 wherein said spring is retained on said non-slip spring retaining surfaces in both compression and tension simultaneously.

14. The universal joint device of claim 7 wherein compression and tension forces are applied simultaneously about at least a periphery portion of each of said socket and handle portions.

15. The universal joint device of claim 14 wherein compression and tension forces are applied simultaneously about the 360 periphery of each of said socket and handle portions.

* * * * *